US012613891B2

(12) United States Patent
Liu et al.

(10) Patent No.: US 12,613,891 B2
(45) Date of Patent: *Apr. 28, 2026

(54) SYSTEM AND METHOD FOR RECOMMENDATION OF TERMS, INCLUDING RECOMMENDATION OF SEARCH TERMS IN A SEARCH SYSTEM

(71) Applicant: Open Text SA ULC, Halifax (CA)

(72) Inventors: Jingjing Liu, Shanghai (CN);
Dingmeng Xue, Shanghai (CN);
Minhong Zhou, Shanghai (CN)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,062

(22) Filed: Aug. 20, 2024

(65) Prior Publication Data

US 2024/0411786 A1 Dec. 12, 2024

Related U.S. Application Data

(63) Continuation of application No. 18/153,230, filed on Jan. 11, 2023, now Pat. No. 12,099,532, which is a continuation of application No. 16/645,352, filed as application No. PCT/IB2018/056642 on Aug. 30, 2018, now Pat. No. 11,586,654.

(60) Provisional application No. 62/556,132, filed on Sep. 8, 2017.

(51) Int. Cl.
*G06F 16/332* (2025.01)
*G06F 16/3329* (2025.01)
*G06F 16/334* (2025.01)

*G06F 16/93* (2019.01)
*G10L 15/02* (2006.01)

(52) U.S. Cl.
CPC ...... *G06F 16/3322* (2019.01); *G06F 16/3329* (2019.01); *G06F 16/3344* (2019.01); *G06F 16/93* (2019.01); *G10L 15/02* (2013.01); *G10L 2015/025* (2013.01)

(58) Field of Classification Search
CPC .. G06F 16/3322; G06F 16/93; G06F 16/3329; G06F 16/3344; G10L 15/02; G10L 2015/025
USPC ........................................ 707/730
See application file for complete search history.

(56) References Cited

U.S. PATENT DOCUMENTS

| | | | | |
|---|---|---|---|---|
| 5,463,715 A * | 10/1995 | Gagnon | .................. | G10L 13/07 704/258 |
| 7,590,626 B2 * | 9/2009 | Li | ....................... | G06F 16/3338 707/999.005 |
| 8,103,506 B1 * | 1/2012 | Meyer | ..................... | G06F 40/20 704/260 |
| 8,676,811 B2 * | 3/2014 | Pan | ....................... | G06F 16/335 707/748 |

(Continued)

*Primary Examiner* — Cam Linh T Nguyen
(74) *Attorney, Agent, or Firm* — Sprinkle IP Law Group

(57) ABSTRACT

Embodiments of systems and methods for providing search term suggestions in a search system are disclosed. Embodiments as disclosed may utilize the sound of an original search term to locate candidate terms based on the sound of the candidate terms and the frequency of appearance of the candidate terms in the corpus of documents being searched. A set of search term suggestions can then be determined from the candidate terms and returned to the user as search term suggestions for the original search term.

21 Claims, 5 Drawing Sheets

(56)                    References Cited

U.S. PATENT DOCUMENTS

| | | | | |
|---|---|---|---|---|
| 8,849,785 | B1 * | 9/2014 | Shattuck | G06F 16/951 |
| | | | | 707/706 |
| 8,898,166 | B1 * | 11/2014 | Navrides | G06F 16/9024 |
| | | | | 705/342 |
| 9,454,957 | B1 * | 9/2016 | Mathias | G10L 15/187 |
| 10,445,376 | B2 * | 10/2019 | Azimi | G06N 3/084 |
| 10,546,001 | B1 * | 1/2020 | Nguyen | G06N 20/00 |
| 2003/0046110 | A1 * | 3/2003 | Gogolak | G16B 20/40 |
| | | | | 705/2 |
| 2003/0225750 | A1 * | 12/2003 | Farahat | G06F 16/951 |
| 2004/0236729 | A1 * | 11/2004 | Dingledine | G16B 50/10 |
| 2006/0080303 | A1 * | 4/2006 | Sargent | G06F 16/31 |
| 2006/0195461 | A1 * | 8/2006 | Lo | G06F 16/93 |
| 2007/0233678 | A1 * | 10/2007 | Bigelow | G06F 16/904 |
| 2008/0019496 | A1 * | 1/2008 | Taschereau | H04L 29/06 |
| | | | | 379/218.01 |
| 2008/0046405 | A1 * | 2/2008 | Olds | G06F 16/3322 |
| 2011/0055071 | A1 * | 3/2011 | Jones | G06Q 40/02 |
| | | | | 705/38 |
| 2014/0289636 | A1 * | 9/2014 | Johnson | G06F 16/9027 |
| | | | | 715/736 |
| 2015/0212791 | A1 * | 7/2015 | Kumar | G06F 3/167 |
| | | | | 715/728 |
| 2018/0210905 | A1 * | 7/2018 | Coleman | G06F 16/254 |
| 2018/0373691 | A1 * | 12/2018 | Alba | G06F 40/166 |

* cited by examiner

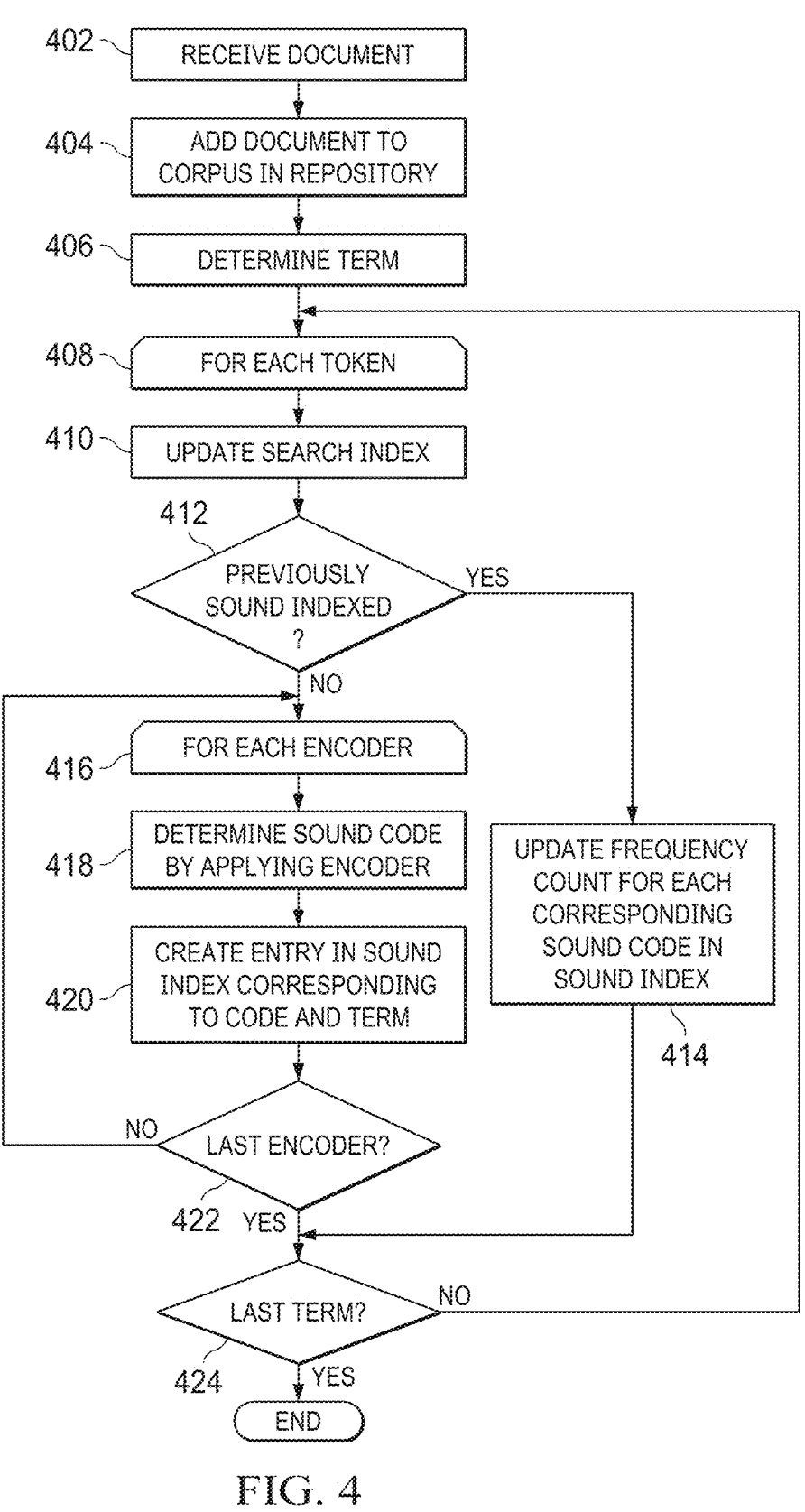

402 — RECEIVE DOCUMENT

404 — ADD DOCUMENT TO CORPUS IN REPOSITORY

406 — DETERMINE TERM

408 — FOR EACH TOKEN

410 — UPDATE SEARCH INDEX

412 — PREVIOUSLY SOUND INDEXED ?

YES

NO

416 — FOR EACH ENCODER

418 — DETERMINE SOUND CODE BY APPLYING ENCODER

420 — CREATE ENTRY IN SOUND INDEX CORRESPONDING TO CODE AND TERM

UPDATE FREQUENCY COUNT FOR EACH CORRESPONDING SOUND CODE IN SOUND INDEX

414

NO — LAST ENCODER?

422   YES

LAST TERM?   NO

424   YES

END

FIG. 4

502 — RECEIVE SEARCH TERM

504 — GET TERM FREQUENCY (IN CORPUS)

506 — DETERMINE CANDIDATE TERMS

508 — FOR EACH CANDIDATE TERM

510 — DETERMINE SOUND EDIT DISTANCE

516 — LAST CANDIDATE TERM? — NO — YES

518 — RANK CANDIDATE TERMS

520 — SELECT AND RETURN SEARCH TERM SUGGESTIONS

END

SYSTEM AND METHOD FOR RECOMMENDATION OF TERMS, INCLUDING RECOMMENDATION OF SEARCH TERMS IN A SEARCH SYSTEM

RELATED APPLICATION(S)

This application is a continuation of, and claims a benefit of priority under 35 U.S.C. 120 of, U.S. patent application Ser. No. 18/153,230 filed Jan. 11, 2023, entitled "SYSTEM AND METHOD FOR RECOMMENDATION OF TERMS, INCLUDING RECOMMENDATION OF SEARCH TERMS IN A SEARCH SYSTEM," which is a continuation of, and claims a benefit of priority under 35 U.S.C. 120 of, U.S. patent application Ser. No. 16/645,352 filed Mar. 6, 2020, issued as U.S. Pat. No. 11,586,654, entitled "SYSTEM AND METHOD FOR RECOMMENDATION OF TERMS, INCLUDING RECOMMENDATION OF SEARCH TERMS IN A SEARCH SYSTEM," which is a national stage application of and claims the benefit of priority to International Application No. PCT/IB2018/056642 filed Aug. 30, 2018, entitled "SYSTEM AND METHOD FOR RECOMMENDATION OF TERMS, INCLUDING RECOMMENDATION OF SEARCH TERMS IN A SEARCH SYSTEM," which claims a benefit of priority under 35 U.S.C. 119 to U.S. Provisional Patent Application No. 62/556,132, filed Sep. 8, 2017, entitled "SYSTEM AND METHOD FOR RECOMMENDATION OF TERMS, INCLUDING RECOMMENDATION OF SEARCH TERMS IN A SEARCH SYSTEM," which are hereby incorporated herein for all purposes.

TECHNICAL FIELD

This disclosure relates generally to search systems. More particularly, this disclosure relates to embodiments of search systems capable of suggesting alternative search terms. Even more specifically, this disclosure relates to embodiments of search systems capable of suggesting alternative search terms based on the sounds of such search terms.

BACKGROUND

A search system (often referred to as a search engine) is a computer system used to index electronically stored information and search the indexed electronic information to return electronically stored information responsive to a search. In a conventional search engine, a user submits a query and the search engine selects a set of results from the corpus based on the terms of the search query. The terms of search queries usually specify words, phrases, logical relationships, metadata fields to be searched, synonyms, stemming variations, etc.

In such a conventional search engine, search index may specify which documents contain which terms. When a user submits a search, the search terms may be evaluated against the search index to determine results (e.g., documents of the corpus) responsive to the search. Generally, there are two basic methods for selecting a set of results from a corpus based on a search query. In the first method, a document that meets the explicit search terms of the search query will be selected as responsive. In the second method, for some types of search applications, the set of results selected is constrained (or further constrained) by a relevance measure. In particular, results selected by evaluating a search query as an explicit query are further scored and ordered by some criteria, and only the highest results are selected.

One problem that occurs in conjunction with the use of these types of search engines is that a searching user may enter a search term that may not necessarily be the keyword that will obtain a desired search result. For example, the user may misspell a search term. Accordingly, some search systems may provide suggestions to a searching user for additional, different or substitute search terms based on the search terms the user enters. By allowing a user to select additional or substitute terms, higher quality (e.g., more relevant or responsive) search results may be returned in response to a search.

Typically, these search systems may utilize a conventional spell checker to determine if the user has misspelled any search terms and provide correctly spelled words as search term suggestions. Edit distance algorithms may also be used to provide search term suggestions, whereby terms that are less than a certain edit distance from a search term may be provided as suggestions to a user. While this approach accounts for some misspellings, the use of edit distance is also problematic, at least because edit distance isn't necessarily reflective of terms that may have similar sounds or pronunciation. Thus, like the user of other types of spell checking algorithms, the use of edit distance may not serve to address the certain instances of incorrectly spelled or utilized terms. Moreover, the edit limit distance that may be effectively utilized is usually quite small (e.g., usually less than two), as the use of larger edit distances may adversely affect the performance of such algorithms (e.g., the search for similar terms becomes longer as the edit distance increases).

What is desired, then, are search systems which can provide high quality suggestions for alternative search terms to a searching user.

SUMMARY

To that end, among others, attention is now directed to embodiments of systems and methods for providing search term suggestions in a search system as disclosed herein. Embodiments as disclosed may utilize the sound of an original search term to locate candidate terms based on the sound of the candidate terms and the frequency of appearance of the candidate terms in the corpus of documents being searched. A set of search term suggestions can then be determined from the candidate terms and returned to the user as search term suggestions for the original search term.

In particular, in certain embodiments, the frequency of the original search term may be utilized as a baseline such that all search term suggestions returned may occur more frequently than the original search term in the corpus of documents being searched. In this manner, it can be assured that not only are similar sounding words returned as suggestions but, additionally, that the search terms suggested are more likely to be terms desired by the user. As such, embodiments may offer the advantage of providing relevant, high quality search term suggestions that may account both for misspelled words and the unintentional use of homophones by the searching user (e.g., of more frequently used or desired search terms).

In one embodiment, a set of candidate terms may be generated using each of a set of different phonetic encoder modules, each phonetic encoder module employing a different phonetic encoder. A phonetic encoder module thus may receive a term (e.g., an original search term), encode the term to produce a corresponding code, and return a set of candidate terms associated with the corresponding code. To assemble the set of candidate terms, one or more phonetic encoder modules may be used to generate a corresponding set of candidate terms based on the sound code of the original search term. Candidate terms having a frequency (of appearance in the corpus) less than the original search term may be discarded. The set of candidate terms comprises the set of candidate terms returned by each phonetic encoder module.

In some embodiments, these phonetic encoder modules may be ordered such that they may be evaluated according to the order to determine the set of candidate terms generated by each phonetic encoder module until a threshold number of candidate terms is obtained. In another embodiment, an initial phonetic encoder module (e.g., employing an Exact Match phonetic encoder) may be utilized to determine a set of candidate terms. If no candidate terms are returned by the initial phonetic encoder module (or less than a candidate threshold number of candidates are returned), one or more, or all of the other phonetic encoder modules may be utilized to generate the set of candidate search terms.

Once the set of candidate terms is generated using the phonetic encoder modules, in one embodiment, each of the candidate terms may be ranked (also referred to as scored, ordered or sorted) based on the frequency (of appearance in the corpus) of the candidate term and the sound distance of the candidate term from the original search term. In one embodiment, the sound distance may be an edit distance (e.g., a Levenshtein distance) of the phoneme sequence between the original search term and the candidate search term. In other words, the minimum number of operations required to transform the phoneme sequence of the candidate term to the phoneme sequence of the original search term. Additionally, the sound distance may be weighted according to the type of operations or steps required to transform the phoneme sequence of the candidate term to the phoneme sequence of the original search term. The weights may be greater for relatively big operations (e.g., substituting a vowel with a consonant, substituting a consonant with a different consonant, inserting or deleting a consonant) and lesser for relatively smaller magnitude operations (e.g., substituting a vowel with another vowel, substituting a consonant with a similar consonant, inserting or deleting a vowel). The greater weights may be, for example, approximately twice the lesser weights. The score or sorting of the candidate terms can be determined based on the frequency or sound distance. For example, the candidate terms may be ranked according to sound distance (with the least sound distance having a higher ranking) and candidate terms with the same sound distance ranked relative to one another according to frequency (of appearance in the corpus), with a candidate term with greater frequency ranking higher than a candidate term with a lesser frequency. A formula may be used to consider both the frequency and sound distance for each candidate term to generate a score for each candidate term and the candidate terms ranked according to their score. Other methods of ranking the candidate search terms are also possible. A set of candidate search terms may then be selected based on their ranking or ordering and returned to the user as search term suggestions.

In certain embodiments, to facilitate the searching of candidate search terms, a separate sound index may be maintained. The sound index may include, for each term of the corpus, an entry for that term for each sound code generated by each of the sound encoder modules of the search system. The sound code is associated with the search term itself and a frequency count indicating the number of appearances of the term in the corpus of documents associated with the search system. Each entry in the sound index may thus comprise a term that appears in the corpus, a code (e.g., a code for the term generated by a sound encoder module utilized by the search system) and a frequency for the term. Each entry could be stored, for example, as a triple (<code, frequency, term>) such that the entries in the sound index are ordered first by code, then by frequency. The sound index could be maintained in a triple store or the like.

Accordingly, when a phonetic encoder module is generating a set of candidates, it may search this sound index based on the sound code that the phonetic encoder module generated for the original search term and the frequency of the original search term (which may also be obtained from the sound index if desired by searching on the original search term). For example, a prefix query can be made on the code for the original search term plus the frequency of the original search term. The set of candidate terms generated by the phonetic encoder may be the set of terms that have the identical code and a frequency greater than the frequency of the original search term. As the candidate terms are stored sequentially (e.g., according to an order based on codes or frequency) in the sound index, they may be quickly determined and returned by the phonetic encoder.

To generate such a sound index, in one embodiment, when a document is indexed by a search system when the indexer tokenizes the document to obtain the terms to be indexed, it can be determined if the term is currently in the sound index (e.g., by searching on the term in the sound index). If the term has previously been indexed, the frequency counts associated with each entry in the sound index associated with that term may be incremented. If, however, the term is not in the sound index, for each phonetic encoder module utilized by the search system, that phonetic encoder of the module may be utilized to generate a corresponding code for the term. An entry in the sound index for that code, a frequency of 1 and the term may then be created. In this manner, new entries in the sound index corresponding to that term and the codes generated by each sound encoder module of the search system may be created.

In one particular embodiment, a system for providing suggestions of terms may include a data store storing a sound index and a corpus of documents, and a processor. A non-transitory computer-readable medium stores instructions for determining a frequency of appearance of the original term in the corpus of documents and determining a set of candidate terms. Each candidate term may have a sound code that is the same as a sound code for the original term and may appear more frequently in the corpus of document than the frequency of the original term. The set of candidate terms can be ranked and a number of the candidate terms selected based on the ranking. The selected candidate terms may be provided as suggestions for the original term.

In a similar embodiment, determining a set of candidate terms may include generating the sound code for the original search term according to a phonetic encoder and searching the sound index based on the sound code and the frequency of the original term to determine the set of candidate terms. Each of the set of candidate terms may have the same sound code as the original term and a frequency greater than the frequency of the original term. These phonetic encoders may be an Exact Match, Metaphone, Double Metaphone, Soundex, Caverphone or Daitch-Mokotoff encoder.

In certain embodiments, the set of candidate terms are ranked based on a sound edit distance and the sound edit distance for a candidate term is based on a number of operations required to transform a first phoneme sequence of the candidate term to a second phoneme sequence of the original term. The sound edit distance can be weighted based on a type of the operations required to transform the first phoneme sequence to the second phoneme sequence. The candidates can be ranked based on the frequency of each candidate term.

In some embodiments, a document in the corpus may be indexed to update the sound index. Indexing a document may include determining a set of terms of the document and determining if each term is in the sound index. If a term is in the sound index, a frequency associated with each entry in the sound index associated with the term may be updated. If a term is not in the sound index, a code for the term can be generated using the phonetic encoder and a new entry in the sound index corresponding to the code, the term and a frequency of one created.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 4 is a flow diagram depicting one embodiment of a method for indexing.

DETAILED DESCRIPTION

Figure 1:
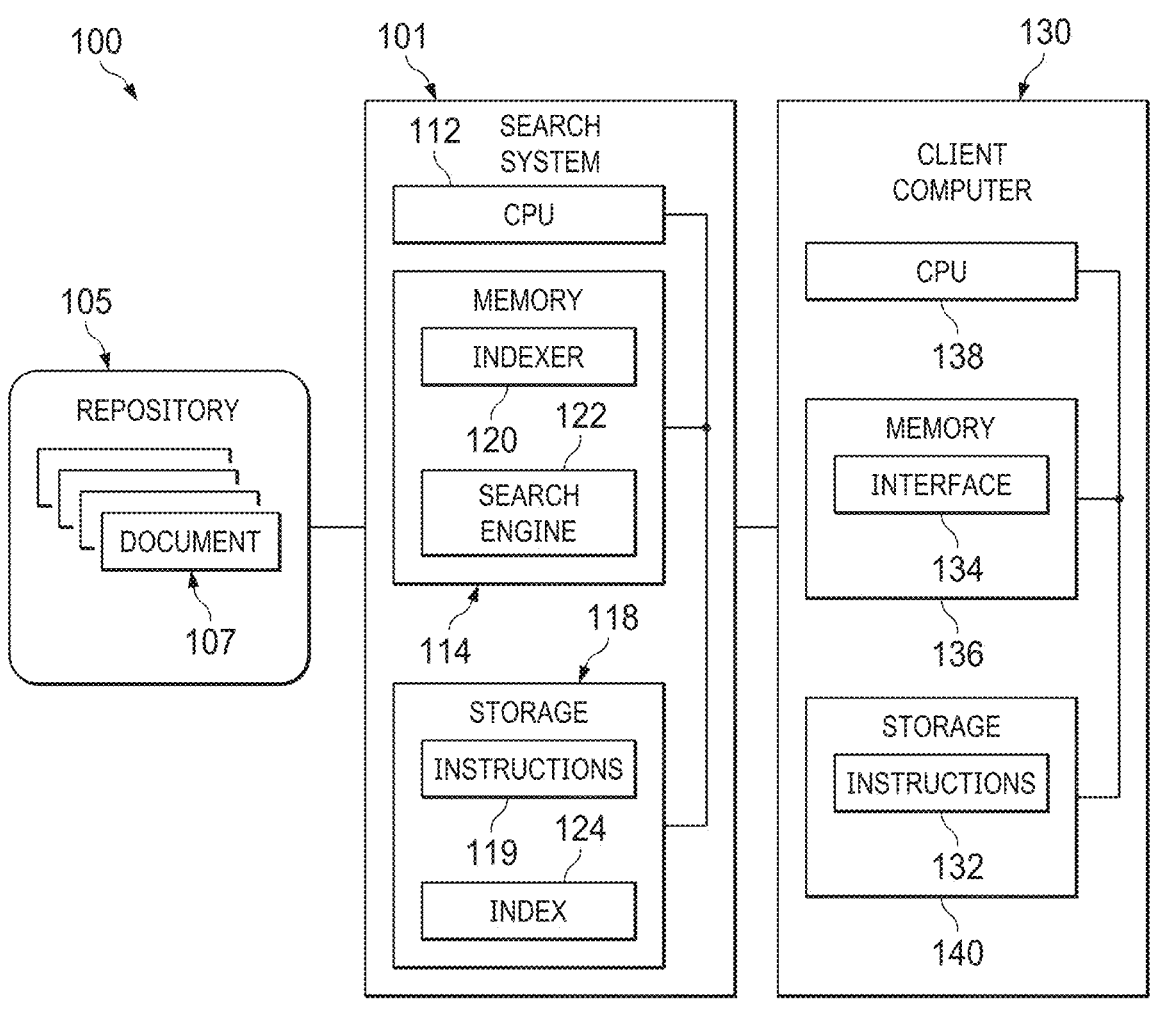
FIG. 1 is a block diagram depicting a computing environment in which one embodiment of a search system can be implemented.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, some additional context may be useful. A search system (often referred to as a search engine) is a computer system used to index electronically stored information (referred to as a corpus) and search the indexed electronic information to return electronically stored information responsive to a search. Items of electronic information that form the corpus may be referred to interchangeably as (electronic) documents, files, objects, items, content, etc. and may include objects such as files of almost any type including documents for various editing applications, emails, workflows, etc. In a conventional search engine, a user submits a query and the search engine selects a set of results from the corpus based on the terms of the search query. The terms of search queries usually specify words, phrases, logical relationships, metadata fields to be searched, synonyms, stemming variations, etc.

In a conventional search engine, when indexing a document, a tokenizer converts the document into discrete tokens (or terms) that are indexed by the search engine in a search index. A search index (sometimes just referred to as an index), such as an inverted index or the like, may specify which documents contain which terms. A tokenizer is a software tool programmed to perform tokenization. Tokenization refers to the process of breaking up a string of text into words, phrases, symbols, or other meaningful elements called tokens (or terms). A token, in this context, refers to a word or an atomic data element that cannot be parsed any further. When a user submits a search, the search terms may be evaluated against the search index to determine results (e.g., documents of the corpus) responsive to the search.

Generally, there are two basic methods for selecting a set of results from a corpus based on a search query. In the first method, a document that meets the explicit search terms of the search query will be selected as responsive. Only items of the corpus that meet the explicit requirements of the search terms are selected and presented. In the second method, for some types of search applications, the set of results selected is constrained (or further constrained) by a relevance measure. In particular, results selected by evaluating a search query as an explicit query are further scored and ordered by some criteria, and only the highest results are selected.

One problem that occurs in conjunction with the use of these types of search engines is that a searching user may enter a search term (often referred to as a keyword) that may not necessarily be the keyword that will obtain a desired search result. For example, the user may misspell a search term. Or, a user may enter a homophone of the actual word he wishes to search for (e.g., the user may desire to search for "whale" but may enter "wail"). Accordingly, some search systems may provide suggestions to a searching user for additional, different or substitute search terms based on the search terms the user enters. By allowing a user to select additional or substitute terms, higher quality (e.g., more relevant or responsive) search results may be returned in response to a search.

Typically, these search systems may utilize a conventional spell checker to determine if the user has misspelled any search terms and provide correctly spelled words as search term suggestions. The use of a spell checker cannot, however, address the situation in which a user has used a homophone of the search term that is actually desired. To account for these instances, some search systems may employ a phonetic algorithm to attempt to locate similar sounding words to a search term and provide these similar sounding words to the user as search term suggestions. These phonetic algorithms may use a phonetic encoder to encode a term (e.g., extract a code for a term based on the sounds of the word) and search a set of terms for terms with similar codes to generate a set of similar search terms that may be provided as suggestions. The use of these phonetic algorithms is problematic for a few reasons. Use of certain phonetic algorithms, such as a sound dictionary based algorithm, may only return terms with the exact same pronunciation and may thus be too restrictive. Other phonetic algorithms that employ phonetic encoders may return too few or too many results (e.g., 100 or more) to be useful in this context. This variability may exist for a single algorithm depending on the term, whereby one algorithm returns too few results for one term and too many for another term. Moreover, these phonetic algorithms may only operate effectively using the first few phonemes of a term, which may adversely impact their efficacy with respect to longer search terms.

As an example, here are examples of the codes produced for the word "bark" by different phonetic algorithms, along with words with that may produce the same code:

| Algorithm | code | Words |
| --- | --- | --- |
| Exact match | b, aa, r, k | bark, barq, barc |
| Metaphone | brk | brick, brook, bourke, brake, brokaw, brugge, baroque, braga, barack, bark, borg . . . |
| Double Metaphone | prk | bourke, brook, bark, prage, bourque, preach, burgh, paraguay, brock, brooke, break, parague, . . . |
| Soundex | b620 | bureaus, bourke, broke, buyers, brass, brugge, borg, burj, baroque, break, bark, . . . |
| Caverphone | pk1111 | big, bag, pack, jpg, park, bark, pork, boogie, butcher, berger, berg, pak, peach, . . . |
| Daitch-Mokotoff | 795,000.00 | wreck, prague, brake, burk, baroque, borough, bark, broke, perugia, brook, . . . |

Edit distance algorithms may also be used to provide search term suggestions, whereby terms that are less than a certain edit distance from a search term may be provided as suggestions to a user. Edit distance is a minimum number of operations (or alterations to the term) that may be needed to transform one term to another term. Thus, terms which are less than a certain edit distance from an original search term may be provided as suggestions to a searching user. While this approach accounts for some misspellings, the use of edit distance is also problematic, at least because edit distance isn't necessarily reflective of terms that may have similar sounds or pronunciation. Thus, like the user of other types of spell checking algorithms, the use of edit distance may not serve to address the use of homophones by a user. Moreover, the edit limit distance that may be effectively utilized is usually quite small (e.g., usually less than two), as the use of larger edit distances may adversely affect the performance of such algorithms (e.g., the search for similar terms becomes longer as the edit distance increases).

What is desired, then, are search systems which can provide high quality suggestions for alternative search terms to a searching user.

To that end, among others, attention is now directed to embodiments of systems and methods for providing search term suggestions in a search system as disclosed herein. Embodiments as disclosed may utilize the sound of an original search term to locate candidate terms based on the sound of the candidate terms and the frequency of appearance of the candidate terms in the corpus of documents being searched. A set of search term suggestions can then be determined from the candidate terms and returned to the user as search term suggestions for the original search term.

In particular, in certain embodiments, the frequency of the original search term may be utilized as a baseline such that all search term suggestions returned may occur more frequently than the original search term in the corpus of documents being searched. In this manner, it can be assured that not only are similar sounding words returned as suggestions but, additionally, that the search terms suggested are more likely to be terms desired by the user. As such, embodiments may offer the advantage of providing relevant, high quality search term suggestions that may account both for misspelled words and the unintentional use of homophones by the searching user (e.g., of more frequently used or desired search terms).

In one embodiment, a set of candidate terms may be generated using each of a set of different phonetic encoder modules, each phonetic encoder module employing a different phonetic encoder. A phonetic encoder module thus may receive a term (e.g., an original search term), encode the term to produce a corresponding code, and return a set of candidate terms associated with the corresponding code. To assemble the set of candidate terms, one or more phonetic encoder modules may be used to generate a corresponding set of candidate terms based on the sound code of the original search term. Candidate terms having a frequency (of appearance in the corpus) less than the original search term may be discarded. The set of candidate terms comprises the set of candidate terms returned by each phonetic encoder module.

In some embodiments, these phonetic encoder modules may be ordered such that they may be evaluated according to the order to determine the set of candidate terms generated by each phonetic encoder module until a threshold number of candidate terms is obtained. In another embodiment, an initial phonetic encoder module (e.g., employing an Exact Match phonetic encoder) may be utilized to determine a set of candidate terms. If no candidate terms are returned by the initial phonetic encoder module (or less than a candidate threshold number of candidates are returned), one or more, or all, of the other phonetic encoder modules may be utilized to generate the set of candidate search terms.

Once the set of candidate terms is generated using the phonetic encoder modules, in one embodiment, each of the candidate terms may be ranked (also referred to as scored, ordered, or sorted) based on the frequency (of appearance in the corpus) of the candidate term and the sound distance of the candidate term from the original search term. In one embodiment, the sound distance may be an edit distance (e.g., a Levenshtein distance) of the phoneme sequence between the original search term and the candidate search term.

In other words, in one embodiment, the minimum number of operations required to transform the phoneme sequence of the candidate term to the phoneme sequence of the original search term. Additionally, the sound distance may be weighted according to the type of operations or steps required to transform the phoneme sequence of the candidate term to the phoneme sequence of the original search term. The weights may be greater for relatively big operations (e.g., substituting a vowel with a consonant, substituting a consonant with a different consonant, inserting or deleting a consonant) and lesser for relatively smaller magnitude operations (e.g., substituting a vowel with another vowel, substituting a consonant with a similar consonant, inserting or deleting a vowel). The greater weights may be, for example, approximately twice the lesser weights.

In certain embodiments, the score or sorting of the candidate terms can be determined based on the frequency or sound distance. For example, the candidate terms may be ranked according to sound distance (with the least sound distance having a higher ranking) and candidate terms with the same sound distance ranked relative to one another according to frequency (of appearance in the corpus), with a candidate term with greater frequency ranking higher than a candidate term with a lesser frequency. A formula may be used to consider both the frequency and sound distance for each candidate term to generate a score for each candidate term and the candidate terms ranked according to their score. Other methods of ranking the candidate search terms are also possible. A set of candidate search terms may then be selected based on their ranking or ordering and returned to the user as search term suggestions.

In particular embodiments, a separate sound index may be maintained to facilitate the searching of candidate search terms. The sound index may include, for each term of the corpus, an entry for that term for each sound code generated by each of the sound encoder modules of the search system. The sound code is associated with the search term itself and a frequency count indicating the number of appearances of the term in the corpus of documents associated with the search system. Each entry in the sound index may thus comprise a term that appears in the corpus, a code (e.g., a code for the term generated by a sound encoder module utilized by the search system) and a frequency for the term. Each entry could be stored, for example, as a triple (<code, frequency, term>) such that the entries in the sound index are ordered first by code, then by frequency. The sound index could be maintained in a triple store or the like.

Accordingly, when a phonetic encoder module is generating a set of candidates, it may search this sound index based on the sound code that the phonetic encoder module generated for the original search term and the frequency of the original search term (which may also be obtained from the sound index if desired by searching on the original search term). For example, a prefix query can be made on the code for the original search term plus the frequency of the original search term. The set of candidate terms generated by the phonetic encoder may be the set of terms that have the identical code and a frequency greater than the frequency of the original search term. As the candidate terms are stored sequentially (e.g., according to an order based on codes or frequency) in the sound index, they may be quickly determined and returned by the phonetic encoder. The use of embodiments of this type of a sound index may therefore speed not only the searching process within the sound index, but additionally may speed the determination or selection of candidate and, in turn, speed the overall searching process of a user.

To generate embodiments of such a sound index, in one embodiment, when a document is indexed by a search system when the indexer tokenizes the document to obtain the terms to be indexed, it can be determined if the term is currently in the sound index (e.g., by searching on the term in the sound index). If the term has previously been indexed, the frequency counts associated with each entry in the sound index associated with that term may be incremented. If, however, the term is not in the sound index, for each phonetic encoder module utilized by the search system, that phonetic encoder of the module may be utilized to generate a corresponding code for the term. An entry in the sound index for that code, a frequency of 1 and the term may then be created. In this manner, new entries in the sound index corresponding to that term and the codes generated by each sound encoder module of the search system may be created.

In one particular embodiment, a system for providing suggestions of terms may include a data store storing a sound index and a corpus of documents, and a processor. A non-transitory computer-readable medium stores instructions for determining a frequency of appearance of the original term in the corpus of documents and determining a set of candidate terms. Each candidate term may have a sound code that is the same as a sound code for the original term and may appear more frequently in the corpus of document than the frequency of the original term. The set of candidate terms can be ranked and a number of the candidate terms selected based on the ranking. The selected candidate terms may be provided as suggestions for the original term.

In a similar embodiment, determining a set of candidate terms may include generating the sound code for the original search term according to a phonetic encoder and searching the sound index based on the sound code and the frequency of the original term to determine the set of candidate terms. Each of the set of candidate terms may have the same sound code as the original term and a frequency greater than the frequency of the original term. These phonetic encoders may be an Exact Match, Metaphone, Double Metaphone, Soundex, Caverphone or Daitch-Mokotoff encoder.

In certain embodiments, the set of candidate terms are ranked based on a sound edit distance and the sound edit distance for a candidate term is based on a number of operations required to transform a first phoneme sequence of the candidate term to a second phoneme sequence of the original term. The sound edit distance can be weighted based on a type of the operations required to transform the first phoneme sequence to the second phoneme sequence. The candidates can be ranked based on the frequency of each candidate term.

In some embodiments, a document in the corpus may be indexed to update the sound index. Indexing a document may include determining a set of terms of the document and determining if each term is in the sound index. If a term is in the sound index, a frequency associated with each entry in the sound index associated with the term may be updated. If a term is not in the sound index, a code for the term can be generated using the phonetic encoder and a new entry in the sound index corresponding to the code, the term and a frequency of one created.

Before describing embodiments in detail, it may be helpful to discuss an example search system in which embodiments as disclosed herein may be utilized. It will be noted at this point that while embodiments as described herein are described in conjunction with their use in search systems other embodiments may also be effectively utilized in other contexts, such as for use in spell checking when composing or editing documents in an editing application or other setting where suggestions of alternative terms may be useful, as will be understood by those of ordinary skill in the art. Thus, the description of embodiments in the context of a search system should be taken as exemplary only and not in any way as a limitation on embodiments generally. All such alternative embodiments or uses of the systems and methods described are fully contemplated herein without loss of generality.

Looking then at FIG. 1, a block diagram illustrating an example of computing environment 100 having repository 105, search system 101, and client computer 130 is depicted. Repository 105 may comprise a file server or database system or other storage mechanism remotely or locally accessible by search system 101. Repository 105 may store documents 107 (e.g., objects, images, emails or other objects) that may be searchable by search system 101.

In the embodiment of FIG. 1, search system 101 comprises a server having central processing unit ("CPU") 112 connected to memory 114 and storage unit 118. CPU 112 may represent a single processor, multiple processors, a processor(s) with multiple processing cores and the like. Storage unit 118 may include a non-transitory storage medium such as hard disk drives, flash memory devices, optical media and the like. Search system 101 may be connected to a data communications network.

Storage unit 118 stores computer executable instructions 119 and index 124. Computer executable instructions 119 can represent one or more programs or operating system code. In one embodiment, instructions 119 are executable to provide indexer 120 and search engine 122. Indexer 120 and search engine 122 may be portions of the same program or may be separate programs. For example, indexer 120 may be a component of a document management system while search engine 122 is a separate program that interfaces with the document management system. Furthermore, indexer 120 and search engine 122 can be implemented on different computing systems and can, themselves, be distributed.

Index 124 includes data used to identify documents in response to a search query and may also include text used to identify objects. In particular, in one embodiment, the index 124 may specify which documents 107 contain which terms. Index 124 can include a single index containing metadata and text, separate metadata and text indexes or other arrangements of information. While shown as a single index, index 124 may include multiple indices as will be discussed in more detail.

Client computer system 130 may include components similar to those of the server of search system 101, such as CPU 138, memory 136, and storage 140. Additionally, client computer system 130 may include executable instructions 132 to provide user interface 134 that allows a user to enter a search query. User interface 134 may be provided through a web browser, file system interface or other program. Thus, the user interface 134 may be provided from the search system 101 and rendered or displayed on the client computer 130.

Those skilled in the art will appreciate that search system 101 shown in FIG. 1 is merely an example of a computing system and embodiments of a search system that may be implemented using other computing systems or functionality (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, indexer 120 may analyze documents 107 in repository 105 to determine information to be indexed in index 124. When a document 107 is added to search system 101, two types of information may be indexed, one or both full text and metadata. As an example, suppose document 107 being added to search system 101 is a text file, the text or content of the file is indexed as well as information about the document. In particular, a tokenizer converts the document being indexed into discrete tokens (or terms) that are used to create or update entries in index 124 to indicate which terms the document contains. Indexer 120 can send indexing instructions to search engine 122 to direct search engine 122 to add, modify, or delete data in index 124, or may itself add, modify, or delete data in index 124.

When a search query is received at search system 101, search engine 122 determines the search terms of the search query and can utilize the information in index 124 to identify documents 107 responsive to the search query. A list or other representation of those responsive documents 107 may be provided through the interface 134. An example search engine will now be described with reference to FIG. 2.

Figure 2:
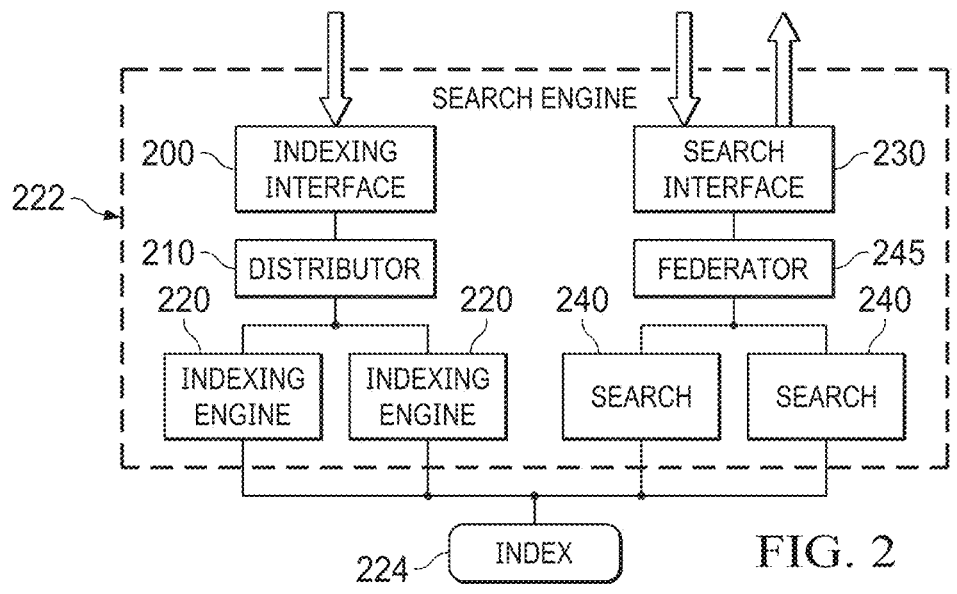
FIG. 2 is a block diagram depicting one embodiment of a search engine.

FIG. 2 depicts a diagrammatic representation of logical blocks for one embodiment of search engine 222. Search engine 222 may provide indexing interface 200 that receives indexing requests (e.g., from indexer 120) or other source. A distributor module 210 may distribute the indexing requests to indexing engines 220 that act on the indexing requests to update index 224. Search engine 222 may also include search interface 230 to receive queries (e.g., from a user, a content server or other source). Search interface 230 may send queries to search modules 240. Federator 245 may gather the results from all search modules 240 together, and generate a response to the query received through search interface 230. Search modules 240 are responsible for performing searches on an index partition, computing relevance score, sorting results, and retrieving metadata regions to return.

In the above example, a user has constructed the search queries. It should be noted, however, that the user could be any system that issues queries to the search system, and may include other computer programs searching on behalf of other users, creating reports or running automatic processes. Since there can be many different types of metadata and/or attributes in the search index, the search queries are not restricted to "text" based search terms.

FIG. 2 is provided by way of example. Search engine 222 may include any number of other modules or configurations to update and search index 224. For example, search modules 240 and indexing engines 220 may be a single module. Search engine 222 may be a portion of a larger program, such as a document management program, may be a separate program or may be implemented according to any suitable programming architecture. Furthermore, the processes of search engine 222 may be distributed across multiple computer systems. Additionally, while in FIG. 2, index 224 is illustrated as a single index, index 224 may comprise a set of smaller or different indices as will be discussed.

It will be recalled from the above discussion that one problem that occurs in conjunction with the use of these types of search engines is that a searching user may enter a search term (often referred to as a keyword) that may not necessarily be the keyword that will obtain a desired search result. For example, the user may misspell a search term. Or, a user may enter a homophone of the actual word he wishes to search for (e.g., the user may desire to search for "whale"

but may enter "wail"). Accordingly, some search systems may provide suggestions to a searching user for additional, different or substitute search terms based on the search terms the user enters. By allowing a user to select additional or substitute terms, higher quality (e.g., more relevant or responsive) search results may be returned in response to a search. It is desired, however, to provide high quality suggestions based on the sounds of original search terms and the frequency of terms as used in the corpus of documents being searched.

To that end, among others, attention is now directed to embodiments of systems and methods for providing search term suggestions in a search system as disclosed herein. Embodiments as disclosed may utilize the sound of an original search term to locate candidate terms based on the sound of the candidate terms and the frequency of appearance of the candidate terms in the corpus of documents being searched. A set of search term suggestions can then be determined from the candidate terms and returned to the user as search term suggestions for the original search term.

Figure 3A:
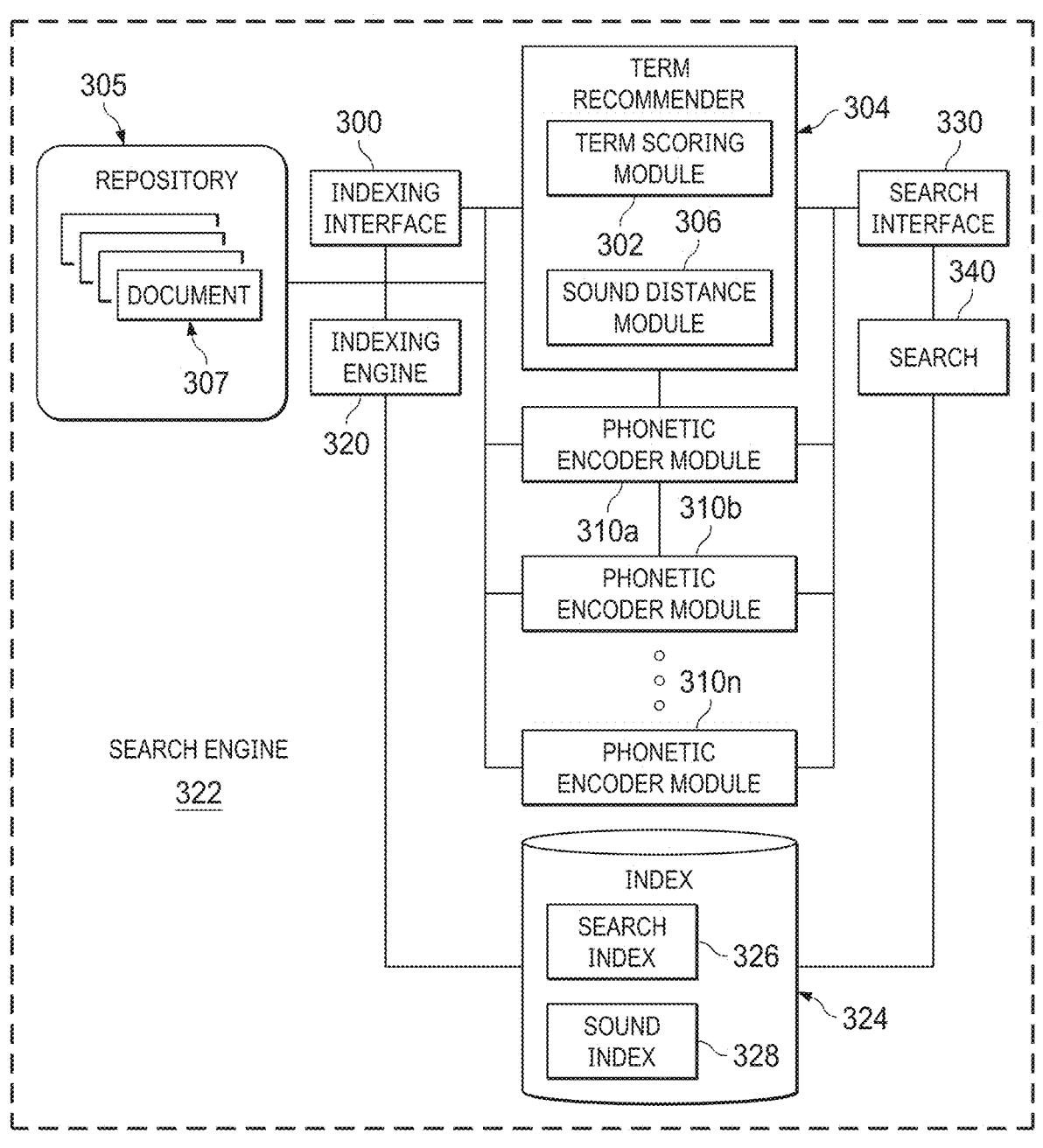
FIG. 3A is a block diagram depicting one embodiment of a search engine having a term recommender.

FIG. 3A depicts a diagrammatic representation of one embodiment of search engine 322 including a term recommender 304 utilized in association with search interface 330. The search interface 330 may allow a user or other application to submit a search query comprising one or more search terms. The search interface 330 may communicate one or more search terms of the query to the term recommender 304, which may return one or more search term suggestions to the search interface 330. The search interface 330 can present the search term suggestions to a user and allow the user to select a search term suggestion as an additional or replacement search term for the search query. The search query can then be passed to search module 340 which executes the search query on the documents 307 of the repository 305 using search index 326 of index 324 to identify documents 307 responsive to the search query. A list or other representation of those responsive documents 307 may be provided to the user through the search interface 330.

Term recommender 304 may thus receive an original search term from search interface 330 and provide one or more search term suggestions in response. The search term suggestions may be based on the sound of the original search term and the frequency of appearance of terms in the documents 307 of the repository 305. To facilitate the generation of search term suggestions, search engine 322 includes phonetic encoder modules 310 (e.g., 310a, 310b, 310n). Each phonetic encoder module 310 may employ a different phonetic encoder or phonetic encoding algorithm to create a (phonetic) code for an input term and may return the generated code or one or more terms used in the corpus of documents 307 associated with the code generated for the input term. Examples of phonetic encoders of phonetic encoding algorithms that may be employed by phonetic encoder modules 310 include Exact Match, Metaphone, Double Metaphone, Soundex, Caverphone, and Daitch-Mokotoff, among others.

Accordingly, the phonetic encoder module 310 may include an interface by which a code may be requested for an input term. When an input term is received via this interface, the phonetic encoder of the phonetic encoder module 310 may be applied to the input term to generate a code and the code returned. Another interface may be provided by phonetic encoder module 310 by which a set of terms associated with an input term may be requested. For this latter interface, in some embodiments a frequency may also be specified such that only terms associated with an input term that appear more (in the corpus of documents 307) than the specified frequency will be returned. In particular, in one embodiment, the interface may allow the frequency to be defined by the input term itself, such that only terms associated with an input term that appear more (in the corpus of documents 307) than the input term will be returned. To determine the terms to return, the phonetic encoder module may search sound index 328 based on the code generated from the input term.

More specifically, the sound index 328 may include one or more entries for each term utilized in the corpus of documents 307, where the term is associated with the set of sound codes generated for the term by each of phonetic encoder modules 310. The entry for the term may also specify the frequency (e.g., number of occurrences) of the term in corpus of documents associated with the search system. Each entry in the sound index may thus comprise a term that appears in the corpus, a code (e.g., a code for the term generated by a phonetic encoder module 310 utilized by the search system) and a frequency for the term. Each entry could be stored, for example as a triple (<code, frequency, term>) such that the entries in the sound index are ordered first by code, then by frequency. As an example, a portion of the entries in the sound index 328 could appear as follows:

| hmfn | 1 | homefone |
| hmfn | 3 | homephone |
| hmfn | 230 | homophony |
| hmfn | 550 | homophonous |
| hmfn | 556 | homophonic |
| hmfn | 600 | homophone |

Indexing engine 320 may create or update entries in sound index 328 when indexing a document 307 of the corpus. Specifically, when an indexing interface 300 receives an indexing requests, the document 307 may be passed to indexing engine 320 to analyze the document 307 to determine information to be indexed in index 324. As discussed, a tokenizer converts the document 307 being indexed into discrete terms that are used to create or update entries in index 324 to indicate which terms the document contains in search index 326. Additionally, for each term of the document 307 being indexed, it can be determined if the term is currently in the sound index 328 (e.g., by searching on the term in the sound index). If the term has previously been indexed in the sound index 328, the frequency counts associated with each entry in the sound index associated with that term may be incremented. If, however, the term is not in the sound index 328, for each phonetic encoder module 310 utilized by the search system, that phonetic encoder of the module may be utilized to generate a corresponding code for the term. An entry in the sound index 328 for that code, a frequency of 1 and the term may then be created. For example, the term may be provided as input to phonetic encoder module 310a via an interface that returns a code generated by the phonetic encoder employed by phonetic encoder module 310a. The code returned by the phonetic encoder module 310a may then be used by indexing engine 320 to create an entry in the sound index 328 for that code, a frequency of 1 and the term. The same can be repeated for phonetic encoder modules 310b, 310n, etc. In this manner, new entries in the sound index 328 corresponding to that term and the codes generated by each phonetic encoder module 310 of the search engine 322 may be created.

Accordingly, when a phonetic encoder module 310 receives a request for a set of terms associated with an input term, the phonetic encoder module 310 may generate a code for the input term using the phonetic encoder and search the sound index 328 for entries for that code. In some embodiments, this search may be a search for entries in the sound index 328 having that code and a frequency over a certain frequency threshold. This frequency threshold may be specified in the received request or may be determined by determining the frequency of the input term from the sound index 328 (e.g., searching the sound index 328 for an entry associated with the input term and using the frequency associated with that entry as the frequency threshold). As the entries in the sound index 328 may be sorted by code and frequency, the search of the sound index 328 for a code and frequency may be accomplished relatively quickly. The terms associated with the entries in the sound index 328 returned from the search may be returned by the phonetic encoder module 310 in response to the received request.

Term recommender 304 may thus utilize these phonetic encoder modules 310 to determine one or more search term suggestions to provide in response to receiving an original search term from search interface 330. In particular, term recommender 304 may call one or more phonetic encoder module 310 with the original search term to request a candidate set of terms. The term recommender 304 may also determine the frequency (of appearance in the corpus of documents 307) of the original search term (e.g., by accessing sound index 328 as described) and provide this frequency in the request to each phonetic encoder module 310, such that each phonetic encoder module 310 may only return candidate terms that occur with greater frequency than the original search term.

In some embodiments, these phonetic encoder modules 310 may be ordered such that they may be evaluated according to the order to determine the set of candidate terms generated by each phonetic encoder module 310 until a threshold number of candidate terms is obtained. In another embodiment, an initial phonetic encoder module (e.g., phonetic encoder module 310a employing an Exact Match phonetic encoder) may be called to determine the candidate set of terms. If no terms are returned by the initial phonetic encoder module 310 (or less than a candidate threshold number of terms are returned), one or more, or all of the other phonetic encoder modules 310 may be utilized to generate the set of candidate search terms.

The candidate set of terms returned by each of the called phonetic encoder modules 310 can then be evaluated to select the set of suggested search terms from the candidate terms returned form the phonetic encoder modules 310. In one embodiment, the term recommender 304 may utilize term scoring module 302 to rank the candidate terms returned from the called phonetic encoder modules 310 based on the frequency (of appearance in the corpus of documents 307) of a candidate term or the sound distance of a candidate term from the original search term.

The sound distance may be an edit distance (e.g., a Levenshtein distance) of the between the phoneme sequence of the original search term and the phoneme sequence of the candidate search term. In other words, the minimum number of operations required to transform the phoneme sequence of the candidate term to the phoneme sequence of the original search term. Term recommender 304 may thus include a sound distance module 306 for determining an edit distance between two terms. The sound distance module 306 may generate phoneme sequences for each term and a sound distance based on a determination of the number of operations required to transform the phoneme sequence of one term to the phoneme sequence of the other term. The sound distance module 306 may be utilized by term scoring module 302 to determine the sound distance between the original search term and a candidate search term.

Additionally, in one embodiment, sound distance module 306 may determine the sound distance based on weights associated with the type of operations or steps required to transform the phoneme sequence of the candidate term to the phoneme sequence of the original search term. The weights may be greater for relatively big operations (e.g., substituting a vowel with a consonant, substituting a consonant with a different consonant, inserting or deleting a consonant) and lesser for relatively smaller magnitude operations (e.g., substituting a vowel with another vowel, substituting a consonant with a similar consonant, inserting or deleting a vowel). The greater weights may be, for example, approximately twice the lesser weights. Thus, to determine a sound distance, the sound distance module 306 may determine not only the minimum number of operations required to transform the phoneme sequence of the candidate term to the phoneme sequence of the original search term but a type for each of the operations.

For example, in one embodiment, sound distance module 306 may determine the sound distance between two terms as follows:

Given two sequences a and b,
m is the length of a, i is the index of a;
n is the length of b, j is the index of b;
d is the matrix used to calculate the distance, d(i,j) is the minimum distance of a $[0, i-1]$ and b $[0, j-1]$. $d_{i,j}(i=m, j=n)$ is the result.

$$d_{i,j} = \begin{cases} 0, & \text{if } i = 0, j = 0 \\ d_{i-1,0} + w(a_{i-1}), & \text{if } j = 0, 1 \le i \le m \\ d_{0,j-1} + w(b_{j-1}), & \text{if } i = 0, 1 \le j \le n \\ \min \begin{cases} d_{i-1,j} + w(a_{i-1}) \\ d_{0,j-1} + w(b_{j-1}) \\ d_{i-1,j-1} + w(a_{i-1}, b_{j-1}) \end{cases}, & \text{if } 1 \le i \le m, 1 \le j \le n \end{cases}$$

Once a sound distance is determined for each of the candidate terms, term recommender 304 may rank the candidate terms based on the frequency or sound distance. For example, the candidate terms may be ranked according to sound distance (with the least sound distance having a higher ranking) and candidate terms with the same sound distance ranked relative to one another according to frequency (of appearance in the corpus), with a candidate term with greater frequency ranking higher than a candidate term with a lesser frequency. As another example, a formula may be used to consider both the frequency and sound distance for each candidate term to generate a score for each candidate term and the candidate terms ranked according to their score. One example of such a formula is $$\frac{\log(\text{frequency})}{(\text{sound distance})^n}.$$

As but one more example, to rank the set of candidate terms, the terms may first be ranked according to the number of phonetic encoding modules 310 that returned the candidate term (where a candidate term returned by a greater number of phonetic encoding modules 310 is ranked higher that a candidate term returned by fewer phonetic encoding modules 310). Candidate terms returned by the same number of phonetic encoding modules 310 may then be ordered by their frequency of occurrence in the corpus or by their sound distance score. Other methods of ranking the candidate search terms are also possible.

Term recommender module 304 may then select one or more of the set of candidate terms based on their ranking and return the selected candidate terms to the user through search interface 330 as search term suggestions. For example, the top five ranked candidate terms may be selected and returned as search term suggestions.

Figure 3B:
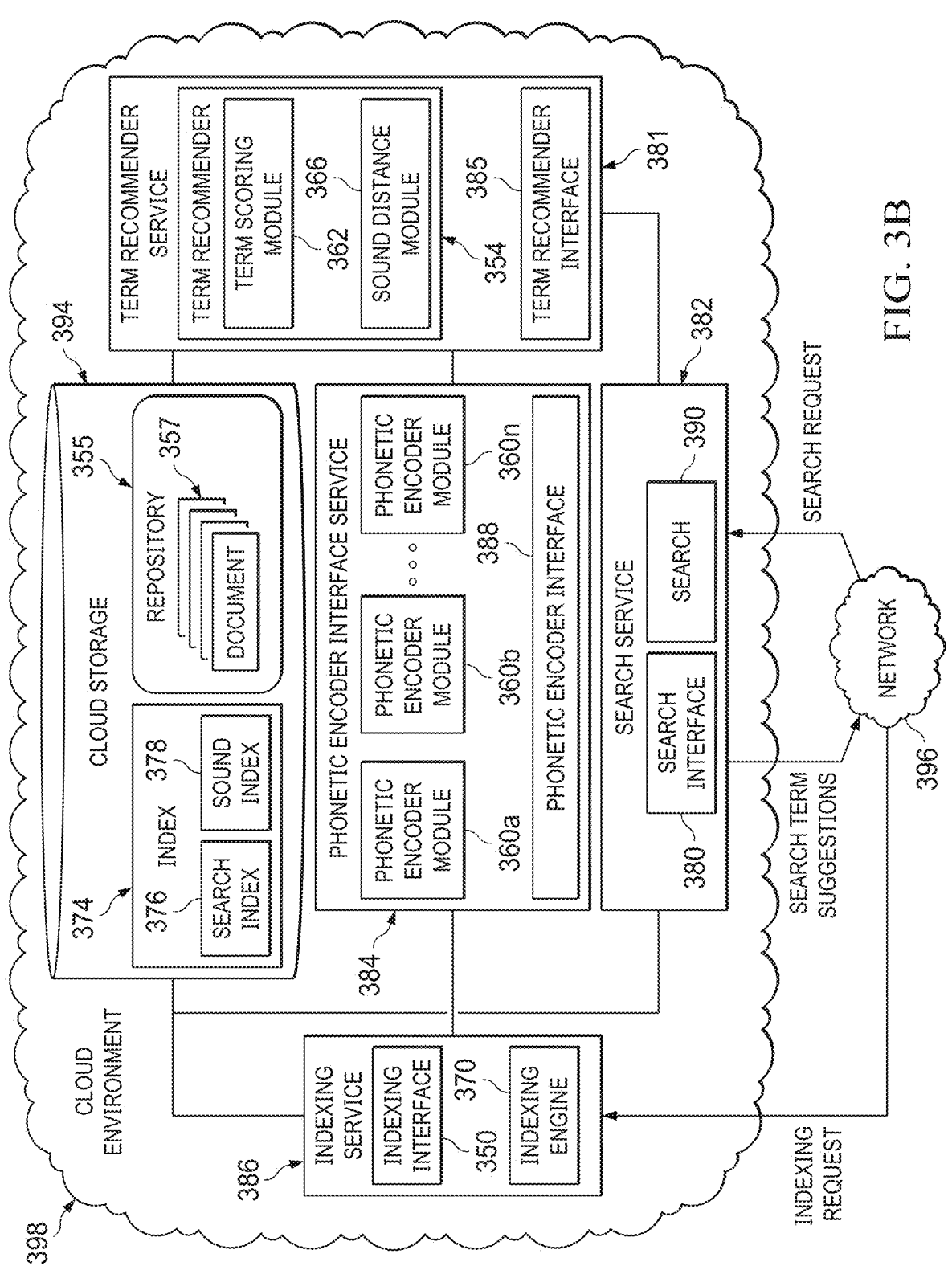
FIG. 3B is a block diagram depicting one embodiment of a search engine having a term recommender deployed in a cloud based computing platform.

It will be noted that embodiments of term recommenders and search systems that utilize such term recommenders may be usefully applied in a variety of contexts and environments. For example, embodiments of search systems that utilize term recommenders may be usefully deployed in a cloud based computer environment, as depicted in the embodiment illustrated in FIG. 3B. Cloud based computer environment 398 may be a network of distributed servers. In some embodiments, cloud computing environment 398 may defined by a network of distributed servers under the control of an organization on behalf of a set of users or clients who may access one or more of a set of software or other services executing on the servers remotely and which may be accessible over a computer based network 396. In some instances still, the organization is an external organization independent of the users or clients.

The various components of a term recommender or search system may thus be deployed in the cloud based computing environment 398 by deploying services associated with a with the search system using the cloud based computer environment 398. By deploying the modules of the search system in the cloud as services or other cloud based applications (collectively services), such services can utilize the storage or other functionality provided by the cloud provider while achieving increased security, accessibility or reliability. In the depicted embodiment, for example, the index 374, including the search index 376 and sound index 378 may be stored in the cloud storage 394 along with the repository 355 including documents 357. Examples of cloud based computing environment include, for example, Amazon Web Services or Elastic Compute Cloud, Microsoft Azure and Google Cloud Platform. Web Services In such an embodiment then, term recommender 354 may be deployed in a term recommender service 381 having a term recommender interface 385 accessible through a web services or other type of interface such as Representational State Transfer (REST) interface, a Simple Object Access Protocol (SOAP) interface, an Application Programming Interface (API) or another type of interface accessible over a computer based network. Thus, request for the term recommender 354 may be received and responded to through the term recommender interface 385.

Similarly, indexing engine 370 may be deployed in an indexing service 370 having an indexing interface 350 which may a RESTful interface, a SOAP interface, an API or another type of interface. Here, requests for use of the indexing engine 370 may be received and responded to through the indexing interface 350. Likewise, phonetic encoder module 360 may be provided in a phonetic encoder service 384 accessible through a phonetic encoder interface 388 (again, which may be a RESTful interface, a SOAP interface, an API or another type of interface). Requests for the use of one or more phonetic encoders 360 (which may be specified in a request to the phonetic encoder interface 388) may be received and responded to through the phonetic encoder interface 388.

In this embodiment, then, search 390 and search interface 380 may be deployed in a search service 382 where the search interface 380 may be a RESTful interface, a SOAP interface, an API or another type of interface such that the search interface 330 may allow a user or other application to submit a search query comprising one or more search terms over the network 396. While it will be understood with respect to the following description that similarly named components may operate similarly to those described above, and will not be described fully again with respect to FIG. 3B, it may be useful to discuss briefly the operation of the search system and term recommender 354 as depicted.

Accordingly, when the search interface 380 receives a search over the network 396, the search interface 380 may communicate one or more search terms of the query to the term recommender 354 (e.g., it may send a request for term suggestions to the term recommender interface 385 of term recommender service 380 with the search or one or more terms of the search). The term recommender 354 may return one or more search term suggestions to the search interface 380. For example, a response to the request received at term recommender interface 385 may be returned to the requesting search interface 380 where the response includes the suggested search terms. The search interface 380 can present the search term suggestions to a user and allow the user to select a search term suggestion as an additional or replacement search term for the search query. For example, a response to the search request received at search interface 380 may be returned over network 396 where the response includes the search term suggestions. The search query can then be passed to search module 390 which executes the search query on the documents 357 of the repository 355 using search index 376 of index 374 to identify documents 357 responsive to the search query. A list or other representation of those responsive documents 357 may be provided to the user through the search interface 380.

Term recommender 354 may thus receive an original search term from search interface 380 (e.g., through term recommender interface 385 that received the request for term suggestions from the search interface 380) and provide one or more search term suggestions in response (e.g., through term recommender interface 385) using sound distance module 366 and term scoring module 362. The search term suggestions may be based on the sound of the original search term and the frequency of appearance of terms in the documents 357 of the repository 355. To facilitate the generation of search term suggestions, phonetic encoder modules 360 (e.g., 360a, 360b, 360n) of phonetic encoder interface service 384 may be used as discussed above.

Accordingly, phonetic encoder interface 388 of phonetic encoder interface service 384 may provide an interface by which a code may be requested for an input term from one or more of the phonetic encoder modules 360. When an input term is received via this interface, the phonetic encoder of the phonetic encoder module 360 may be applied to the input term to generate a code and the code returned (e.g., through the phonetic encoder interface 388). Another interface may be provided by phonetic encoder interface 388 through which a set of terms associated with an input term may be requested. For this latter interface, in some embodiments, a frequency may also be specified such that only terms associated with an input term that appear more (in the corpus of documents 357) than the specified frequency will be returned. In particular, in one embodiment, the interface may allow the frequency to be defined by the input term itself, such that only terms associated with an input term that appear more (in the corpus of documents 357) than the input term will be returned (e.g., through phonetic encoder interface 388). To determine the terms to return, the phonetic encoder interface service 384 or phonetic encoder interface 388) may search sound index 378 based on the code generated from the input term.

Indexing engine 370 may create or update entries in sound index 378 when indexing a document 357 of the corpus. Specifically, indexing service 386 may receive request to index a document over network 396. The request may include, for example, the content of the document or a location of the document to index. When the indexing interface 350 receives an indexing request, the document 357 may be passed to indexing engine 370 to analyze the document 357 to determine information to be indexed in index 374 according to phonetic code or frequency, as discussed. The index 374 can thus be searched by phonetic encoder modules 360 to determine a set of terms associated with an input term based on phonetic code or frequency.

Term recommender 354 may thus utilize these phonetic encoder modules 360 (by accessing them through phonetic encoder interface 388) to determine one or more search term suggestions to provide in response to receiving an original search term in a request from search interface 380 as discussed above. The determined search terms can then be provided to the search interface 380 (e.g., a response to the request received at term recommender interface 385 may be returned to the requesting search interface 380 where the response includes the determined search terms) such that the search interface 380 can return these determined search terms as search term suggestions.

Referring now to FIG. 4, a flow diagram for one embodiment of a method of indexing a document in a search system to create a sound index is depicted. A document may be received (STEP 402) and stored in the corpus of documents for the search system (STEP 404). A tokenizer converts the document being indexed into discrete terms (STEP 406). For each of these terms (STEP 408), the search index of the search system is created or updated to indicate which terms the document contains (STEP 410). Additionally, it can be determined if the term is currently in the sound index by searching on the term in the sound index (STEP 412). If the term has previously been indexed in the sound index (Y branch of STEP 412), the frequency counts associated with each entry in the sound index associated with that term may be incremented (STEP 414). If the last term has processed (Y branch of STEP 424) the indexing of the document may end. Otherwise, the next term is processed (STEP 408).

If, however, the term is not in the sound index (N branch of STEP 412) for each phonetic encoder utilized by the search system (STEP 416), that phonetic encoder may be utilized to generate a corresponding code for the term (STEP 418). An entry in the sound index for that code, a frequency of 1 and the term may then be created (STEP 420). Once all encoders have been utilized to generate codes and create entries (Y branch of STEP 422), the next term may be processed if any terms remain (N branch of STEP 424). If the last term has processed (Y branch of STEP 424), the indexing of the document may end.

Figure 5:
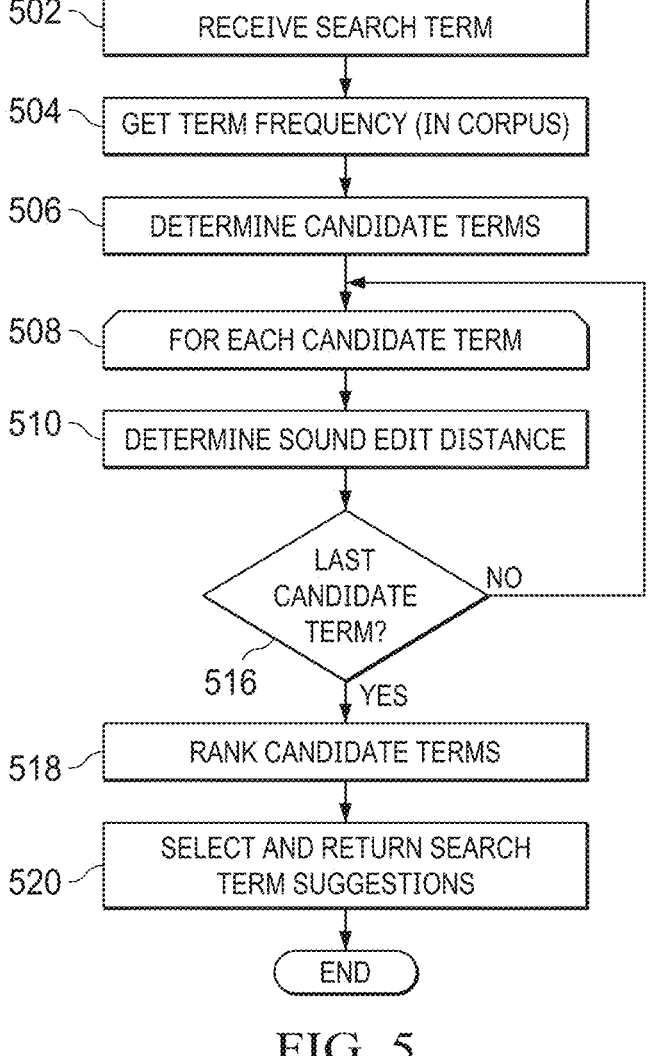
FIG. 5 is a flow diagram depicting one embodiment of a method for providing search term suggestions.

Moving to FIG. 5, a flow diagram of one embodiment of a method for providing search term suggestions in a search system is depicted. Initially, an original search term is received (STEP 502). This original search term may be provided, for example, by a user through a search interface as part of a search query or the like. The frequency of appearance in a corpus of documents of the original search term can then be determined (STEP 504). This determination may be made, for example, by accessing a sound index having entries indicating the frequency of occurrence of terms (e.g., along with their sound code). The determination may also be made by accessing another index or source of data in the search system where such a frequency is maintained. In one embodiment, search suggestions may only be provided if the frequency of the original search term is above a certain threshold. In other embodiments, search suggestions may substantially always be provided.

A set of candidate terms for search suggestions may then be determined (STEP 506). These candidate search terms may be determined using a set of phonetic encoder modules that generate candidate terms for the original search term by generating a sound code for the original search term according to a phonetic encoder and determining terms that both have the same sound code as the original search term and occur in the corpus of documents of the search system more frequently than the original search term.

In some embodiments, these phonetic encoder modules may be ordered such that they may be evaluated according to the order to determine the set of candidate terms generated by each phonetic encoder module until a threshold number of candidate terms is obtained. In another embodiment, an initial phonetic encoder module (such as a phonetic encoder module employing an Exact Match phonetic encoder) may be called to determine the candidate set of terms. If no terms are returned by the initial phonetic encoder module (or less than a candidate threshold number of terms are returned), one or more, or all of the other phonetic encoder modules may be utilized to generate the set of candidate search terms. In one embodiment, if the initial encoder module (e.g., the Exact Match phonetic encoder module) returns any candidate terms, these candidate terms may be ranked based on frequency of appearance of these candidate terms in the corpus and a number of these top ranked candidate terms selected as search term suggestions.

Once the set of candidate terms is determined, for each of the candidate search terms (STEP 508), a sound edit distance may be determined (STEP 510). The sound distance may be an edit distance (e.g., a Levenshtein distance) of the between the phoneme sequence of the original search term and the phoneme sequence of the candidate search term. In other words, the minimum number of operations required to transform the phoneme sequence of the candidate term to the phoneme sequence of the original search term. Additionally, in one embodiment, the sound distance may be determined based on weights associated with the type of operations or steps required to transform the phoneme sequence of the candidate term to the phoneme sequence of the original search term. The weights may be greater for relatively big operations (e.g., substituting a vowel with a consonant, substituting a consonant with a different consonant, inserting or deleting a consonant) and lesser for relatively smaller magnitude operations (e.g., substituting a vowel with another vowel, substituting a consonant with a similar consonant, inserting or deleting a vowel). The greater weights may be, for example, approximately twice the lesser weights.

Once a sound distance is determined for each of the candidate terms (Y branch of STEP 516), the set of candidate terms may be ranked (STEP 518). This ranking may be, for example, based on the frequency of the candidate search term or the sound distance determined for the candidate term. For example, the candidate terms may be ranked according to sound distance (with the candidate terms having the least sound distance having a higher ranking) and candidate terms with the same sound distance ranked relative to one another according to frequency (of appearance in the corpus), with a candidate term with greater frequency ranking higher than a candidate term with a lesser frequency. As another example, a formula may be used to consider both the frequency and sound distance for each candidate term to generate a score for each candidate term and the candidate terms ranked according to their score. One example of such a formula is $$\frac{\log(\text{frequency})}{(\text{sound distance})^n}.$$

As but one more example, to rank the set of candidate terms, the terms may first be ranked according to the number of phonetic encoding modules that returned the candidate term (where a candidate term returned by a greater number of phonetic encoding modules is ranked higher that a candidate term returned by fewer phonetic encoding modules). Candidate terms returned by the same number of phonetic encoding modules may then be ordered by their frequency of occurrence in the corpus or by their sound distance score. Again, in one embodiment, if the initial encoder module (e.g., the Exact Match phonetic encoder module) returns any candidate terms, these candidate terms may be ranked based on frequency of appearance of these candidate terms in the corpus (in this case, the sound distance for each candidate term may not need to be determined). Other methods of ranking the candidate search terms are also possible. One or more of the set of candidate terms may be selected based on their ranking and the selected candidate terms returned to the user through a search interface as search term suggestions (STEP 520). For example, the top five ranked candidate terms may be selected and returned as search term suggestions.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances, some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment, and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include RAMs, ROMs, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A system for providing suggestions of terms, comprising:
   a data store;
   a processor;
   a non-transitory computer-readable medium storing instructions for, in response to receiving an original term:
   determining a frequency of appearance of the original term in a corpus of documents;
   generating a sound code for the original term utilizing a sound encoder module;
   determining a set of candidate terms, each candidate term having a sound code associated with the sound code for the original term and appearing more frequently in the corpus of documents than the frequency of appearance of the original term in the corpus of documents;
   ranking the set of candidate terms;
   selecting a number of the candidate terms based on the ranking of the candidate terms; and
   providing the selected candidate terms in response to receiving the original term.

2. The system of claim 1, wherein determining the set of candidate terms comprises generating the sound code for the original search term and searching a sound index based on the sound code of the original search term and the frequency of the original term to determine the set of candidate terms.

3. The system of claim 2, wherein generating the sound code for the original search term comprises providing the original search term to a phonetic encoder.

4. The system of claim 1, wherein the set of candidate terms are ranked based on a comparison of each candidate term with the original term.

5. The system of claim 4, wherein the comparison comprises a determination of an edit distance between each candidate term and the original term.

6. The system of claim 5, wherein the edit distance is based on a number of type of operation required to transform each candidate search term to the original search term.

7. The system of claim 1, wherein the selected candidate terms as provided as suggestions to use in place of, or in addition to, the original term.

8. A method for providing suggestions of terms, comprising:
   in response to receiving an original term:
   determining a frequency of appearance of the original term in a corpus of documents;
   generating a sound code for the original term utilizing a sound encoder module;
   determining a set of candidate terms, each candidate term having a sound code associated with the sound code for the original term and appearing more frequently in the corpus of documents than the frequency of appearance of the original term in the corpus of documents;
   ranking the set of candidate terms;
   selecting a number of the candidate terms based on the ranking of the candidate terms; and
   providing the selected candidate terms in response to receiving the original term.

9. The method of claim 8, wherein determining the set of candidate terms comprises generating the sound code for the original search term and searching a sound index based on the sound code of the original search term and the frequency of the original term to determine the set of candidate terms.

10. The method of claim 9, wherein generating the sound code for the original search term comprises providing the original search term to a phonetic encoder.

11. The method of claim 8, wherein the set of candidate terms are ranked based on a comparison of each candidate term with the original term.

12. The method of claim 11, wherein the comparison comprises a determination of an edit distance between each candidate term and the original term.

13. The method of claim 12, wherein the edit distance is based on a number of type of operation required to transform each candidate search term to the original search term.

14. The method of claim 8, wherein the selected candidate terms as provided as suggestions to use in place of, or in addition to, the original term.

15. A non-transitory computer-readable medium comprising instructions for:
   in response to receiving an original term:
   determining a frequency of appearance of the original term in a corpus of documents;
   generating a sound code for the original term utilizing a sound encoder module;
   determining a set of candidate terms, each candidate term having a sound code associated with the sound code for the original term and appearing more frequently in the corpus of documents than the frequency of appearance of the original term in the corpus of documents;
   ranking the set of candidate terms;
   selecting a number of the candidate terms based on the ranking of the candidate terms; and
   providing the selected candidate terms in response to receiving the original term.

16. The non-transitory computer-readable medium of claim 15, wherein determining the set of candidate terms comprises generating the sound code for the original search term and searching a sound index based on the sound code of the original search term and the frequency of the original term to determine the set of candidate terms.

17. The non-transitory computer-readable medium of claim 16, wherein generating the sound code for the original search term comprises providing the original search term to a phonetic encoder.

18. The non-transitory computer-readable medium of claim 15, wherein the set of candidate terms are ranked based on a comparison of each candidate term with the original term.

19. The non-transitory computer-readable medium of claim 18, wherein the comparison comprises a determination of an edit distance between each candidate term and the original term.

20. The non-transitory computer-readable medium of claim 19, wherein the edit distance is based on a number of type of operation required to transform each candidate search term to the original search term.

21. The non-transitory computer-readable medium of claim 15, wherein the selected candidate terms as provided as suggestions to use in place of, or in addition to, the original term.

* * * * *